(12) United States Patent
Bell

(10) Patent No.: US 11,787,461 B2
(45) Date of Patent: Oct. 17, 2023

(54) STROLLER SYSTEM

(71) Applicant: Henry J. Bell, Cincinnati, OH (US)

(72) Inventor: Henry J. Bell, Cincinnati, OH (US)

(*) Notice: Subject to any disclaimer, the term of this patent is extended or adjusted under 35 U.S.C. 154(b) by 428 days.

(21) Appl. No.: 17/224,222

(22) Filed: Apr. 7, 2021

(65) Prior Publication Data
US 2021/0316775 A1 Oct. 14, 2021

Related U.S. Application Data

(60) Provisional application No. 63/007,102, filed on Apr. 8, 2020.

(51) Int. Cl.
B62B 7/14 (2006.01)
A63G 9/00 (2006.01)
B62B 9/22 (2006.01)
A47D 13/10 (2006.01)
A47D 13/02 (2006.01)
A47D 9/00 (2006.01)
A47D 9/02 (2006.01)

(52) U.S. Cl.
CPC .............. B62B 9/22 (2013.01); A47D 9/016 (2022.08); A47D 9/057 (2022.08); A47D 13/02 (2013.01); A47D 13/027 (2022.08); A47D 13/105 (2013.01); A63G 9/00 (2013.01); B62B 7/142 (2013.01); B62B 7/145 (2013.01)

(58) Field of Classification Search
CPC ...... B60N 2/2848; A47D 9/016; A47D 9/057; A47D 13/02; A47D 13/027; A47D 13/105; A47D 1/06; A47D 1/08; A47D 1/10; A63G 9/00; A63G 13/02
See application file for complete search history.

(56) References Cited

U.S. PATENT DOCUMENTS

| 3,806,117 | A | * | 4/1974 | Foster | A47D 13/105 280/47.41 |
| D377,466 | S | * | 1/1997 | Baesa | D12/129 |
| 5,988,670 | A | * | 11/1999 | Song | B62B 9/22 280/642 |
| 6,250,654 | B1 | * | 6/2001 | Willis | B62B 7/145 280/30 |
| 6,343,994 | B1 | * | 2/2002 | Clarke | A47D 13/105 5/108 |
| 6,872,146 | B1 | * | 3/2005 | Paesang | A47D 9/005 472/119 |
| 7,422,524 | B2 | * | 9/2008 | Gregorian | A47D 9/04 297/256.13 |

(Continued)

FOREIGN PATENT DOCUMENTS

CN 1234747 A * 11/1999 ........... A47D 13/105
CN 201280147 Y * 7/2009
(Continued)

Primary Examiner — Steve Clemmons
(74) Attorney, Agent, or Firm — Wood Herron & Evans LLP

(57) ABSTRACT

A stroller is disclosed. The stroller includes a support frame supported by at least two wheels. The stroller also includes a seat carrier support selectively, removably coupled to the support frame. A swing motor is operatively coupled to the seat carrier support. A seat swing mechanism extends downwardly from the swing motor. The seat swing mechanism has a seat yoke configured to receive and retain an infant seat. The seat swing mechanism is configured to swing the infant seat forwards and backwards when the swing motor is activated.

15 Claims, 11 Drawing Sheets

(56) References Cited

U.S. PATENT DOCUMENTS

| | | | | |
|---|---|---|---|---|
| 7,445,559 B2* | 11/2008 | Kakuda | A47D 9/016 | 5/93.1 |
| 7,497,461 B2* | 3/2009 | Emerson | B62B 7/145 | 280/42 |
| 8,147,345 B2* | 4/2012 | Furman | A47D 9/016 | 472/118 |
| 8,550,556 B2* | 10/2013 | Asbach | A47D 1/0085 | 297/281 |
| 8,678,942 B2* | 3/2014 | Zhang | A47D 13/105 | 297/184.15 |
| 9,314,116 B2* | 4/2016 | Bell | A63G 9/12 | |
| 9,421,992 B2* | 8/2016 | Mills | B62B 7/145 | |
| 9,861,210 B2* | 1/2018 | Tadipatri | A47D 13/102 | |
| 10,513,285 B1* | 12/2019 | Menen | B62B 7/142 | |
| 11,641,952 B2* | 5/2023 | Tyneski | A47D 9/005 | 297/440.14 |
| 2007/0018490 A1* | 1/2007 | Jones | A47K 11/04 | 297/277 |
| 2007/0060405 A1* | 3/2007 | Grossman | A47D 13/101 | 472/125 |
| 2010/0123341 A1* | 5/2010 | Furman | B60N 2/2845 | 297/217.4 |
| 2010/0320810 A1* | 12/2010 | Chen | A47D 1/08 | 297/118 |
| 2011/0012394 A1* | 1/2011 | Furman | A47D 13/02 | 297/183.1 |
| 2011/0041245 A1* | 2/2011 | Shafer | A47D 9/057 | 5/108 |
| 2015/0175189 A1* | 6/2015 | Chowdhury | B62B 9/22 | 280/47.41 |

FOREIGN PATENT DOCUMENTS

| | | | | |
|---|---|---|---|---|
| CN | 106394644 A | * | 2/2017 | |
| CN | 107157201 A | * | 9/2017 | |
| CN | 109263705 A | * | 1/2019 | |
| GB | 2385027 A | * | 8/2003 | B62B 7/062 |
| GB | 2446389 A | * | 8/2008 | A47D 1/06 |

* cited by examiner

STROLLER SYSTEM

CROSS-REFERENCE TO RELATED APPLICATIONS

This application claims the benefit of priority to U.S. Provisional Patent Application Ser. No. 63/007,102 filed Apr. 8, 2020, the disclosure of which is incorporated by reference herein in its entirety.

TECHNICAL FIELD

The invention relates generally to a stroller, and more particularly, a stroller and a free-standing base configured to receive an infant seat and swing the infant seat.

BACKGROUND

Baby strollers typically have a seat that is fixed to a wheel-supported frame. Consequently, when a baby is in the seat and needs to be transported via car seat in a car, the baby must be removed from the stroller and placed in the car seat. This action may be disruptive to a sleeping baby. To avoid this disruptive action, some baby strollers are configured to receive a car seat so the baby can remain in the car seat in both the stroller and in the car. Some of those baby strollers are configured to swing or rock the car seat. Those baby strollers that may swing or rock a car seat have drawbacks, such as the means by which the car seat attaches to the stroller.

Moreover, the swinging or rocking feature is built into the stroller structure as a single unit and can be used only in conjunction with the stroller. Although this is a good option, this does not solve additional needs of the user. Many infant care givers own infant car seats, strollers, and infant swings. The previously mentioned options all resolve these issues separately, but not collectively. The current need is for a care giver to have the option of swinging or rocking an infant whether in a stationary position (without wheels and indoors) or when on the go, as with a stroller (with wheels—outdoors). This adaption would allow the swinging or rocking feature to become a part of a system of products rather than a singular less adaptive product.

SUMMARY OF THE INVENTION

To these and other ends, a stroller includes a support frame supported by at least two wheels. A seat carrier support is selectively, removably coupled to the support frame. A swing motor is operatively coupled to the seat carrier support. A seat swing mechanism extends downwardly from the swing motor. The seat swing mechanism has a seat yoke configured to receive and retain an infant seat. The seat swing mechanism is configured to swing the infant seat forwards and backwards when the swing motor is activated. In one aspect, one of the at least two wheels is a rear wheel which has a locking mechanism configured to prevent the rear wheel from turning when the swing motor is activated. In another aspect, the support frame may include first and second front members and first and second rear members, where an upper end of the first front member and an upper end of the first rear member being joined at a junction member, the junction member having a receiving extension configured to receive a releasable end on the seat carrier support.

In an embodiment, the seat swing mechanism may further include a main shaft and a clamp member, which is configured to move between a captured position and a release position along the main shaft. In the captured position, a handle of the infant seat is captured between the seat yoke and the clamp member, In the release position, the handle of the infant seat may be removed from the seat yoke. The main shaft may have a plurality of grooves and the clamp member may have a slide member configured to engage the plurality of grooves so as to prevent the clamp member from moving upwardly along the main shaft and so as to allow the clamp member to move downwardly along the main shaft. The slide member may include a plurality of complimentary grooves and the slide member is moveable between an engaged position and a disengaged position. In the engaged position, the plurality of complimentary grooves engage the plurality of grooves on the main shaft and the clamp member is prevented from moving upwardly along the main shaft, but it is able to move downwardly along the main shaft. In the disengaged position, the clamp member is able to move upwardly and downwardly along the main shaft. The slide member may be biased in the engaged position. The clamp member may further include a release button configured to move the slide member from the engaged position to the disengaged position when the release button is pushed. In one aspect, the release button includes an extension with a flat section and a ramped section and the slide member has a flat tab. When the release button is pushed, the ramped section contacts the flat tab to move the slide member from the engaged position to the disengaged position.

In an embodiment, the seat yoke has an upturned portion and the clamp member has a downturned portion such that when the clamp member is in the captured position the downturned portion and the upturned portion form a retaining channel to retain the handle of the infant seat.

In an embodiment, the seat carrier support includes a housing containing a controller and a screen operatively coupled to the controller and configured to display information. The controller is operatively coupled to the swing motor. The housing further includes a first input device operatively coupled to the controller to control an operation of the swing motor and a second input device operatively coupled to the controller to control an operation of the screen. The first input device may be configured to activate or deactivate the swing motor such that when activated the seat swing mechanism swings the infant seat forwards and backwards.

The invention also contemplates an infant swing system including a seat carrier support having a swing motor and a seat swing mechanism extending downwardly from the swing motor. The seat carrier support has a seat yoke configured to receive and retain an infant seat. The infant swing system further includes a stroller having a support frame supported by at least two wheels. The support frame is configured to selectively, removably receive the seat carrier support. The infant swing system also includes a free-standing base configured to selectively, removably receive the seat carrier support. When the seat carrier support is coupled to either the support frame or the free-standing base, the seat swing mechanism is configured to swing the infant seat forwards and backwards when the swing motor is activated.

In an embodiment, the seat swing mechanism further includes a main shaft and a clamp member, which is configured to move between a captured position and a release position along the main shaft. In the captured position, a handle of the infant seat is captured between the seat yoke and the clamp member. In the release position, the handle of the infant seat may be removed from the seat yoke.

The main shaft may have a plurality of grooves and the clamp member may have a slide member configured to engage the plurality of grooves so as to prevent the clamp member from moving upwardly along the main shaft and so as to allow the clamp member to move downwardly along the main shaft. The slide member may include a plurality of complimentary grooves and the slide member is moveable between an engaged position and a disengaged position. In the engaged position, the plurality of complimentary grooves engage the plurality of grooves on the main shaft and the clamp member is prevented from moving upwardly along the main shaft and able to move downwardly along the main shaft. In the disengaged position, the clamp member is able to move upwardly and downwardly along the main shaft. In one aspect, the clamp member may further include a release button configured to move the slide member from the engaged position to the disengaged position when the release button is pushed.

The invention also contemplates an infant seat stand including a free-standing base having two upright members extending from a support member, each upright member has a receiving extension. The infant seat stand further includes a seat carrier support configured to be selectively, removably coupled to the receiving extensions of the upright members. A swing motor is operatively coupled to the seat carrier support. A seat swing mechanism extends downwardly from the swing motor. The seat swing mechanism has seat yoke configured to receive and retain an infant seat. The seat swing mechanism is configured to swing the infant seat forwards and backwards when the swing motor is activated.

In an embodiment, the seat swing mechanism may further include a main shaft and a clamp member, which is configured to move between a captured position and a release position along the main shaft. In the captured position, a handle of the infant seat is captured between the seat yoke and the clamp member. In the release position the handle of the infant seat may be removed from the seat yoke.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
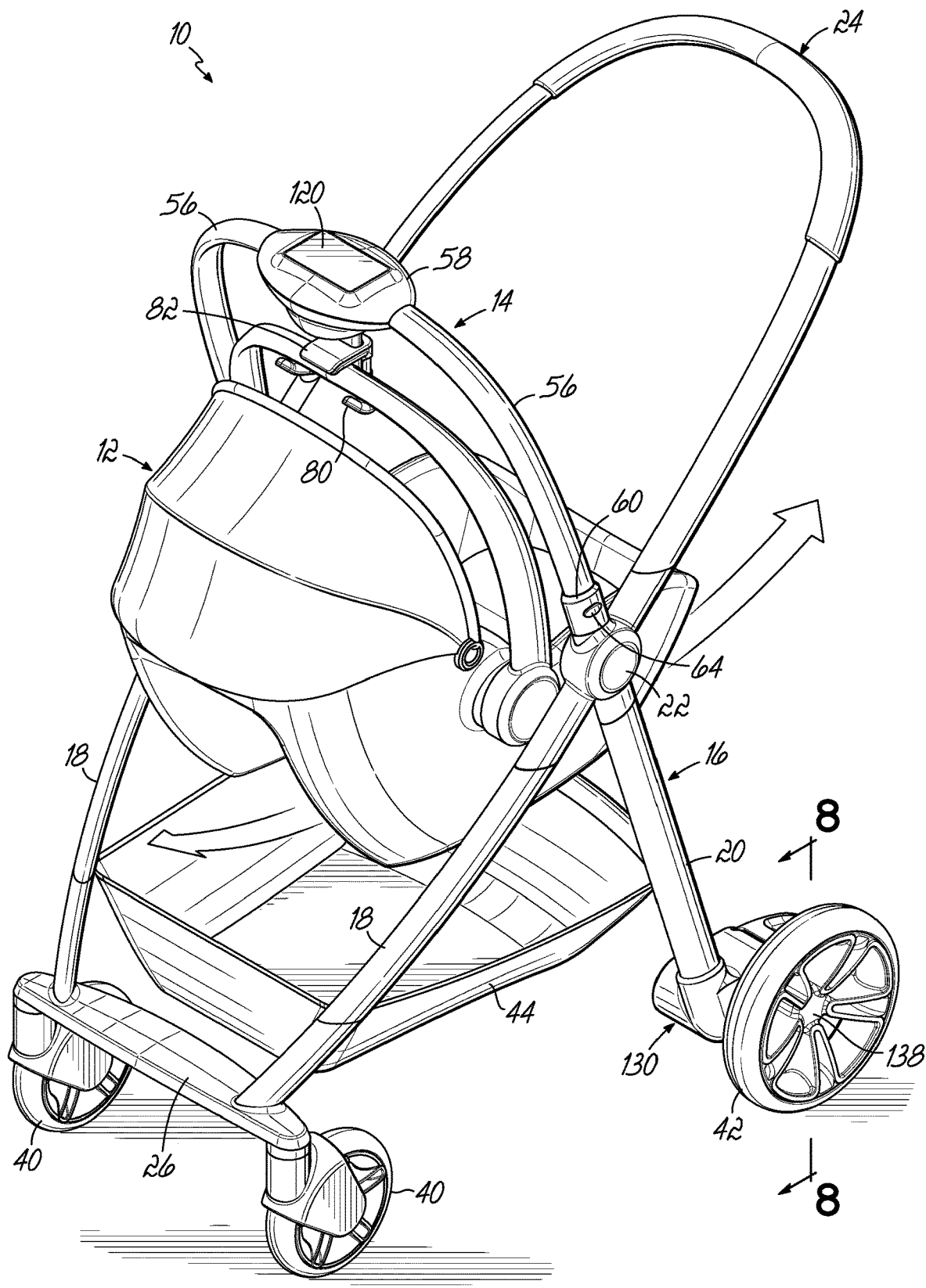
FIG. 1 is a perspective view of a stroller according to one embodiment of the invention with a baby seat installed.

A stroller 10 according to one embodiment of the invention is shown in FIG. 1. An infant seat 12 (sometimes referred to as a car seat) is selectively coupled to the stroller by a seat carrier support 14. The stroller 10 includes a support frame 16 having a pair of front members 18 and a pair of rear members 20 that are joined at their respective upper ends at a junction member 22. A handle 24 extends upwardly from the junction member 22 so that the stroller 10 may be pushed by a user with or without the infant seat 12 being installed. In an embodiment, the junction member 22 is configured to allow the support frame 16 and the handle 24 to collapse into a substantially flat orientation to allow for convenient transport or storage of the stroller 10.

The two front members 18 may be connected at their lower ends by a front cross member 26. The lower ends of the two front members 18 may be supported by front wheels 40, which may be castering wheels. Similarly, the lower ends of the two rear members 20 may be supported by rear wheels 42. In an embodiment, the lower ends of the rear members 20 may be connected by a rear cross brace (not shown), such as an axle, to which rear wheels 42 may be attached. The stroller 10 may also include a carrier or basket 44 coupled proximate the lower ends of the front members 18 and the rear members 20. In an embodiment, the basket 44 may be detachable. The basket 44 is capable of carrying clothes, shoes, diapers, baby wipes, toys, baby food, and the like.

Figure 2:
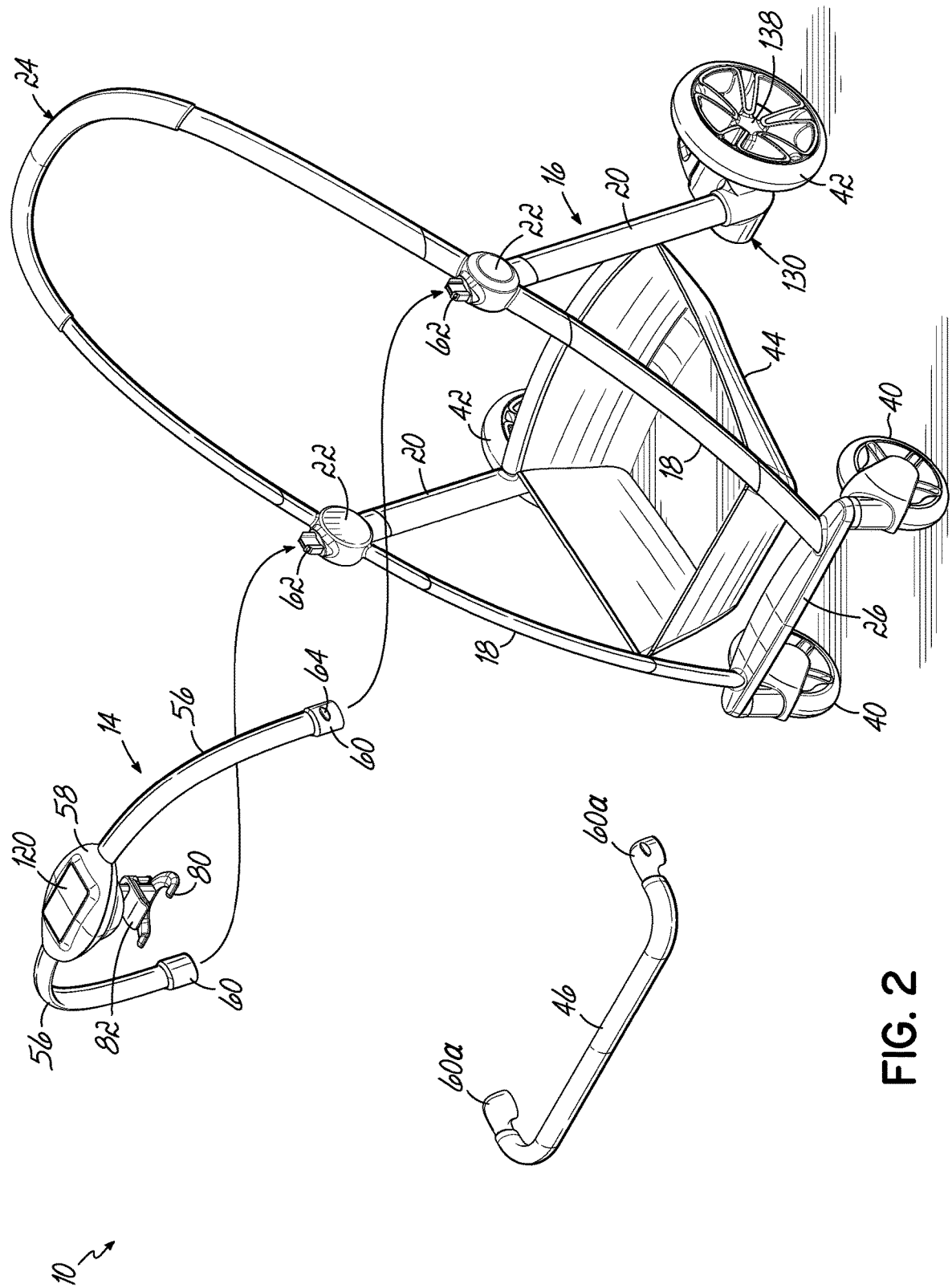
FIG. 2 is a perspective view of the stroller of FIG. 1 to which a seat carrier support or bumper bar may be selectively attached.
Figure 3:
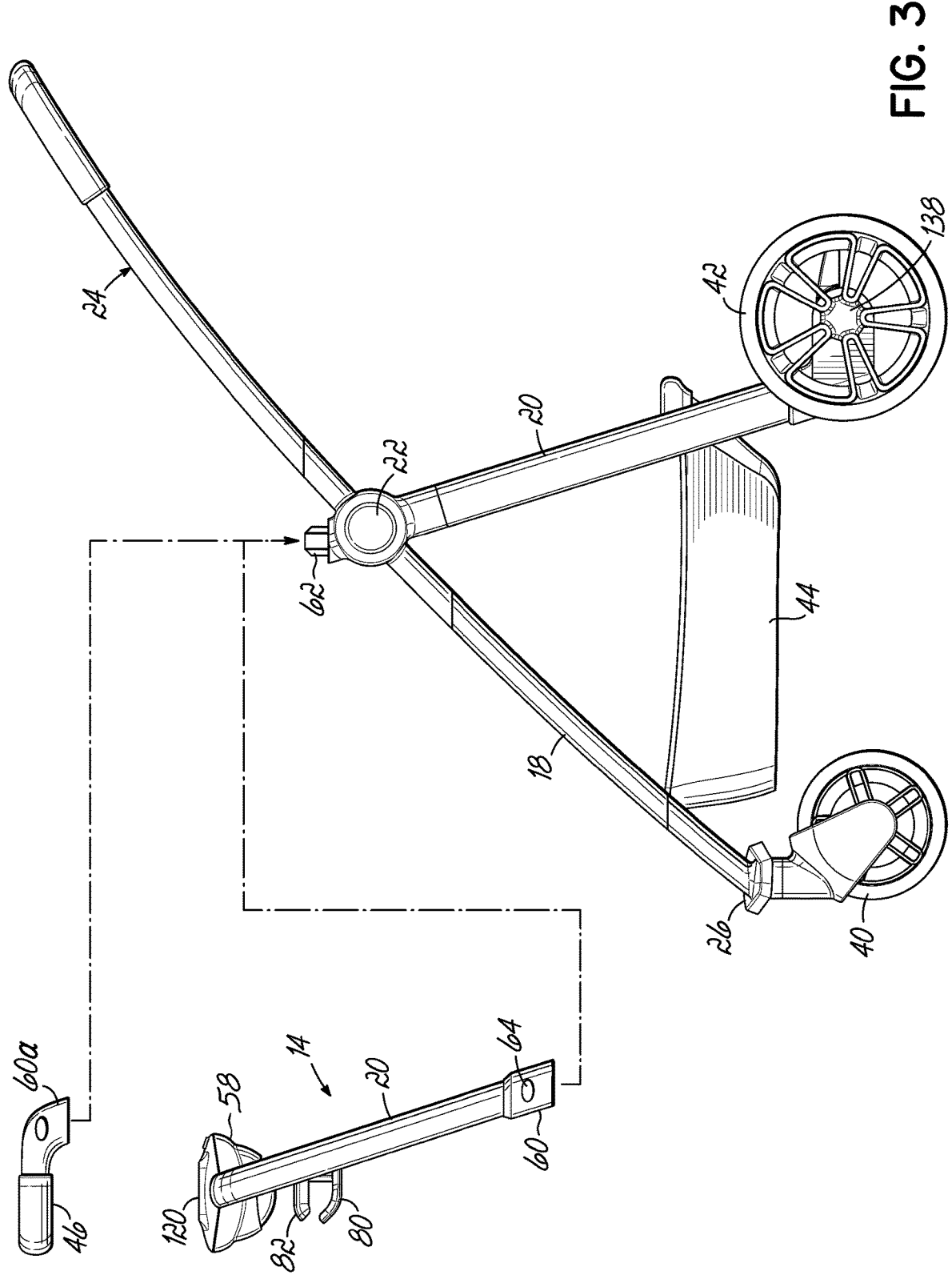
FIG. 3 is an elevational view of stroller of FIG. 2.

As shown in FIGS. 2 and 3, the seat carrier support 14 is configured to be selectively removable from the junction member 22. When the seat carrier support 14 is removed from the stroller 10, a secondary accessory, such as a bumper bar 46 or tray, may be selectively coupled to the junction member 22.

Figure 4:
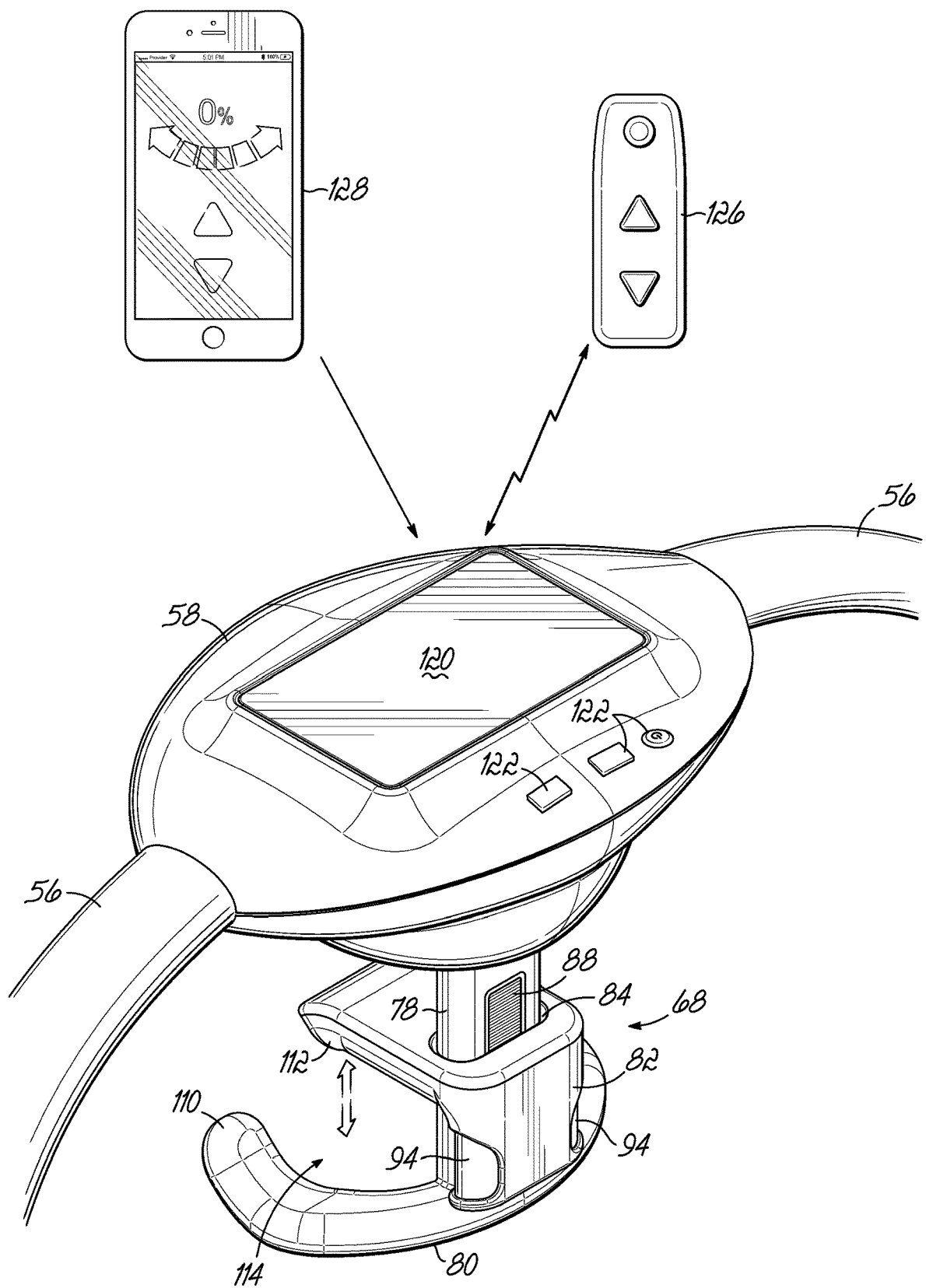
FIG. 4 is an enlarged perspective view of the seat carrier support of the stroller of FIG. 1.

With reference to FIGS. 1, 2, and 4, the seat carrier support 14 includes two down members 56 coupled to a housing 58. As shown in FIG. 2, the seat carrier support 14 may be removably coupled to the junction member 22 via releasable ends 60 on the down members 56 which fit onto receiving extensions 62 on the junction member 22. The releasable ends 60 include a release member 64, such as a button, latch, lever, switch, and the like, that may be activated to release the releasable ends 60 from the receiving extensions 62. It is contemplated that the seat carrier support 14 may be coupled to strollers other than the stroller 10 described and illustrated herein. With other stroller designs, an adapter may need to be coupled to the frame or handle of that stroller in order to allow the seat carrier support 14 to be removably coupled to the stroller. Further, the releasable ends 60 of the seat carrier support 14 may have different configurations to accommodate a stroller with different attachment points or adapters.

With continued reference to FIGS. 1, 2, and 4, a seat swing mechanism 68 is pivotably coupled to and extends from a swing motor 70 (FIG. 6) which is located in the interior of the housing 58. The seat swing mechanism 68 may be swung manually by the user pushing it or the infant seat 12 forwards and backwards or by activating the swing motor 70. The direction of the swinging forwards and backwards is shown by the arrows in FIG. 1. The swing motor 70 may be powered by a power source 72 located in the housing 58. The power source 72 may be electrical or mechanical. For example, the power source 72 may be a battery that provides electrical power to the swing motor 70. In another example, the power source 72 may be a spring (wound up by a handle or crank) that provides mechanical power to the swing motor 70.

Figure 5:
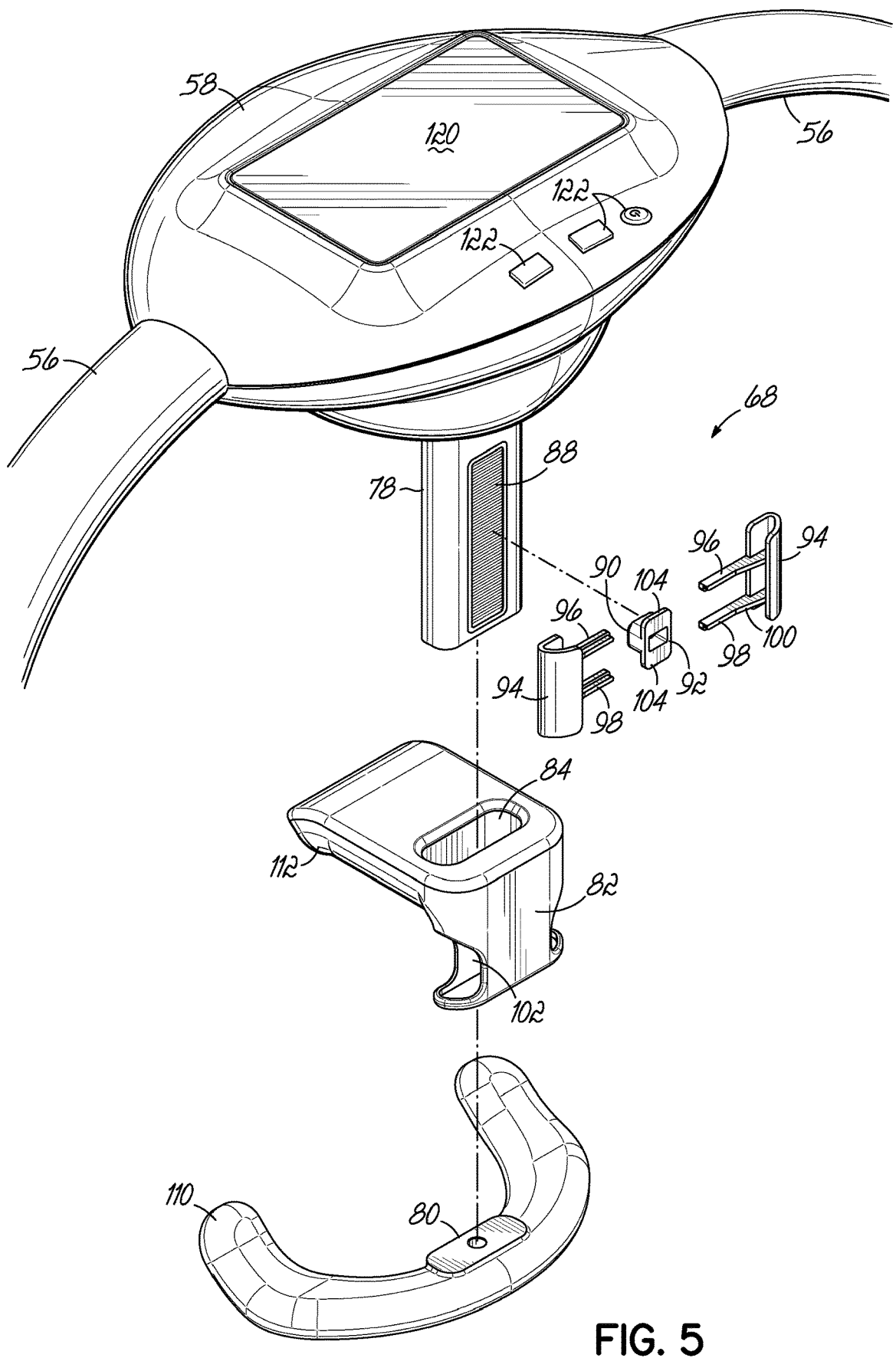
FIG. 5 is a disassembled perspective view of the seat carrier support of FIG. 6.
Figure 6:
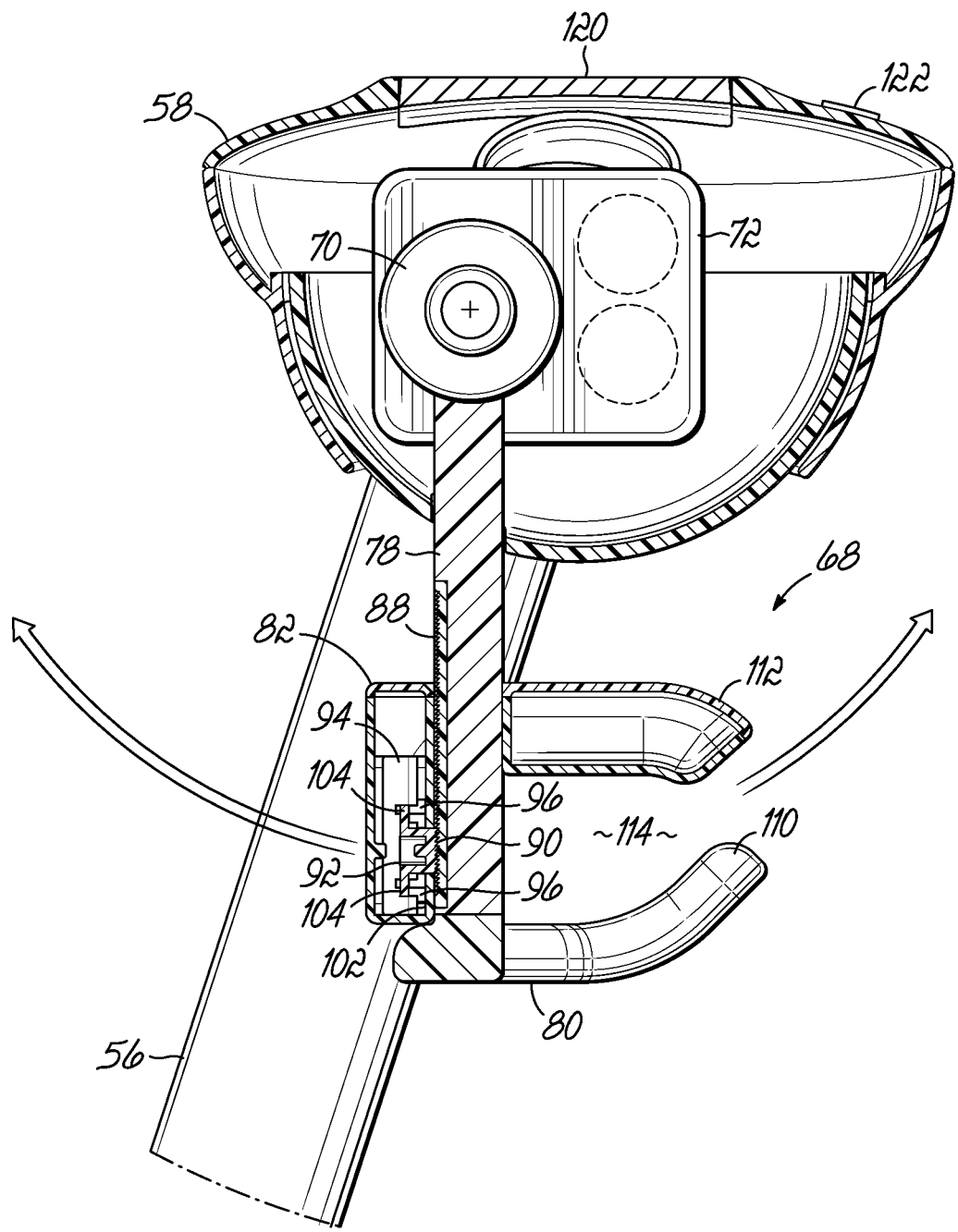
FIG. 6 is a cross-sectional view of the seat carrier support of FIG. 4 coupled to the free-standing base with an infant seat installed.

With reference to FIGS. 4-6, a seat swing mechanism 68 is coupled to and extends down from the swing motor 70. The seat swing mechanism 68 includes a main shaft 78, a seat yoke 80, and a clamp member 82. The clamp member 82 has an aperture 84 sized to receive the main shaft 78 such that the clamp member 82 may slide along the main shaft 78 as shown by the arrows in FIG. 4. With the main shaft 78 inserted through the aperture 84 of the clamp member 82, the seat yoke 80 is affixed to the end of the main shaft 78 to retain the clamp member 82 along the main shaft 78. The clamp member 82 is moveable along the main shaft 78 between a captured position and a released position.

Figure 7A:
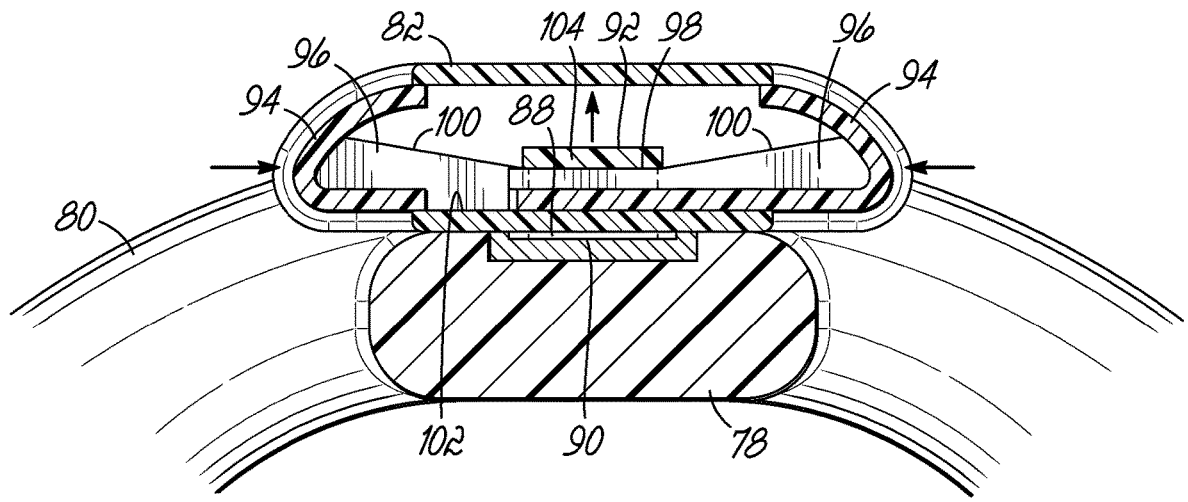
FIG. 7A is a cross-sectional view of the ratchet mechanism in the seat carrier support of FIG. 4 in the engaged position.
Figure 7B:
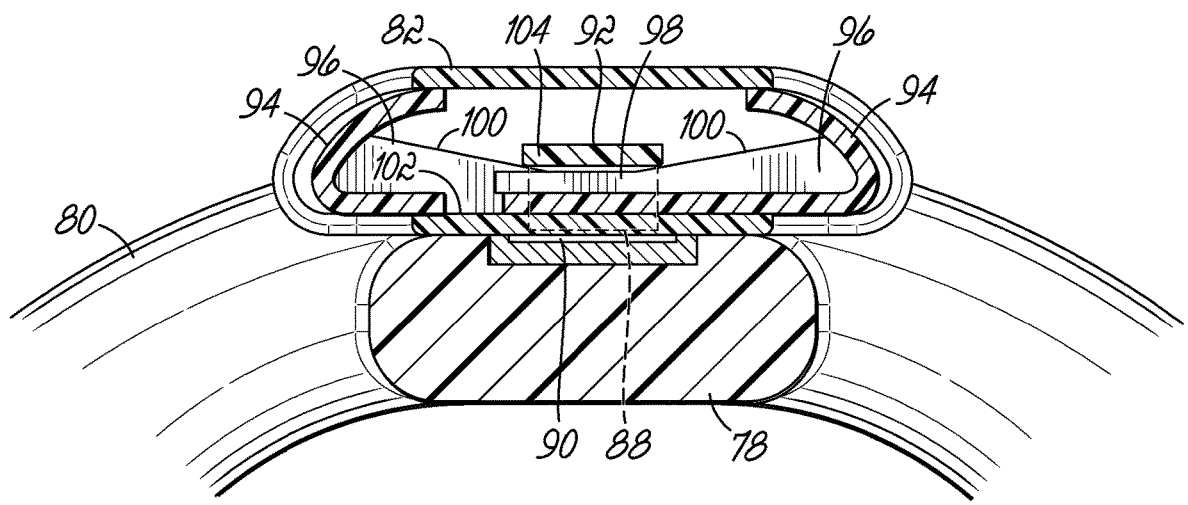
FIG. 7B is a cross-sectional view of the ratchet mechanism in the seat carrier support of FIG. 4 in the disengaged position.

The main shaft 78 includes an area with a plurality of grooves 88 which correspond to a plurality of complementary grooves 90 on slide member 92 which is positioned in the aperture 84 of the clamp member 82. The slide member 92 is moveable in the clamp member 82 from a first or engaged position to a second or disengaged position. The slide member 92 is biased so that the grooves 90 engage the grooves 88 on the main shaft 78, i.e., the engaged position. The grooves 88 and grooves 90 are configured (angled) so that the clamp member 82 may be moved down the main shaft 78 even with the slide member 92 in the engaged position, but may not be moved up the main shaft 78 without the grooves 90 being actively disengaged from the grooves 88, i.e., with the slide member 92 in the disengaged position. To move the slide member 92 between the engaged and disengaged positions, the clamp member 82 includes a pair of release buttons 94, each of which includes a pair of extensions 96. Each extension 96 includes a flat section 98 and a ramped section 100. In the engaged position, the flat sections 98 are positioned between an inner wall 102 of the clamp member 82 and a pair of flat tabs 104 on the slide member 92 (FIG. 7A). When the release buttons 94 are pushed inwardly, the ramped sections 100 begin to engage the flat tabs 104 so as to move the slide member 92 and, more specifically, the grooves 90 away from grooves 88. When the release buttons 94 are pushed sufficient inwardly, the grooves 90 will be fully disengaged from the grooves 88 such that the slide member 92 is in the disengaged position (FIG. 7B). With the release buttons remaining pushed inwardly and the slide member 92 in the disengaged position, the clamp member 82 may be moved upwardly along the main shaft 78. The clamp member 82 may also be moved downwardly along the main shaft 78 with the slide member 92 in the disengaged position, but as noted above, the clamp member 82 may still be moved downwardly along the main shaft 78 even with the slide member 92 in the engage position because of the way the grooves 88 and grooves 90 are configured. When the slide member 92 is in the engaged position and the clamp member 82 is moved downwardly on the main shaft 78, the clamp member 82 will stop and remain at that position when the moving force is removed.

In use, the infant seat 12 is installed on the stroller 10 by first moving the clamp member 82 upwardly on the main shaft 78 by pressing the release buttons 94 inwardly to move the slide member 92 to the disengaged position. The clamp member 82 needs to move away from the seat yoke 80 to create a gap between the clamp member 82 and the seat yoke 80 sufficient for the handle of the infant seat 12 to fit into. The handle of the infant seat 12 is then placed onto the seat yoke 80 and the clamp member 82 pushed downwardly on the main shaft 78 until the gap between the seat yoke 80 and the clamp member 82 is small enough to thereby positively retain the handle of the infant seat 12. As such, the clamp member 82 is in the captured position. To assist with retaining the handle of the infant seat 12, the seat yoke 80 may have upturned portions 110 and clamp member 82 have a downturned portion 112 (FIG. 6) such that they form a retaining channel 114 in which the handle of the infant seat 12 is positioned. To remove the infant seat 12 from the stroller 10, the release buttons 94 are pushed together to place the slide member 92 in the disengaged position and the clamp member 82 is moved up the main shaft 78 to increase the gap between the clamp member 82 and the seat yoke 80. The release buttons 94 are released, the slide member 92 moves to the engaged position, and the clamp member 82 stays in the released position along the main shaft 78. The handle of the infant seat 12 may then be lifted off the seat yoke 80.

With reference to FIG. 4, the housing 58 may include a screen 120 to display information. In an embodiment, the screen 120 may be a touchscreen so that a user may manipulate/interact directly with the screen 120. In another embodiment where the screen 120 is not a touchscreen, the housing 58 may include one or more input devices 122 such as buttons, switches, nobs, sliders, toggles, etc., so the user may manipulate/interact with the screen. The screen 120 may be configured to display various information such as the weather data (temperature, winds, warnings, etc.), date and time, location, map information, music information, etc. The screen 120 may be configured to display pictures or videos. The housing 58 may also include speakers (not shown) to produce audio corresponding to the information displayed on the screen 120.

A controller 124 (FIG. 8) may be located in the interior of the housing 58 and operatively coupled to the screen 120, the input devices 122, and the swing motor 70. The screen 120 (when a touchscreen) or the input devices 122 may be used to activate or deactivate the swing motor 70. When the swing motor 70 is activated the seat swing mechanism 68 swings forwards and backwards as shown by the arrows in FIGS. 1 and 6. The controller 124 may be programmed to deactivate the swing motor 70 after a predetermined amount of time. The controller may also control the speed at which the swing mechanism 68 swings the seat forward and backward.

In an embodiment, a remote control unit 126 (FIG. 4) carried by the user may be used to communicate with the controller 124 so that the user may remotely operate the seat swing mechanism and/or control the screen 120. The remote control may have one or more input devices (similar to those on the screen 120) for the user to send signals to the controller 124.

In an embodiment, the controller 124 may have wireless connectively, such as through Bluetooth™ or Wi-Fi. To that end, a user with a smartphone 128 (FIG. 4) and a control app installed on the smartphone 128 may connect to and control the controller 124. In that regarding the smartphone 128 with the control app acts like the remote control unit 126 to remotely operate the seat swing mechanism and/or control the screen 120.

Figure 8:
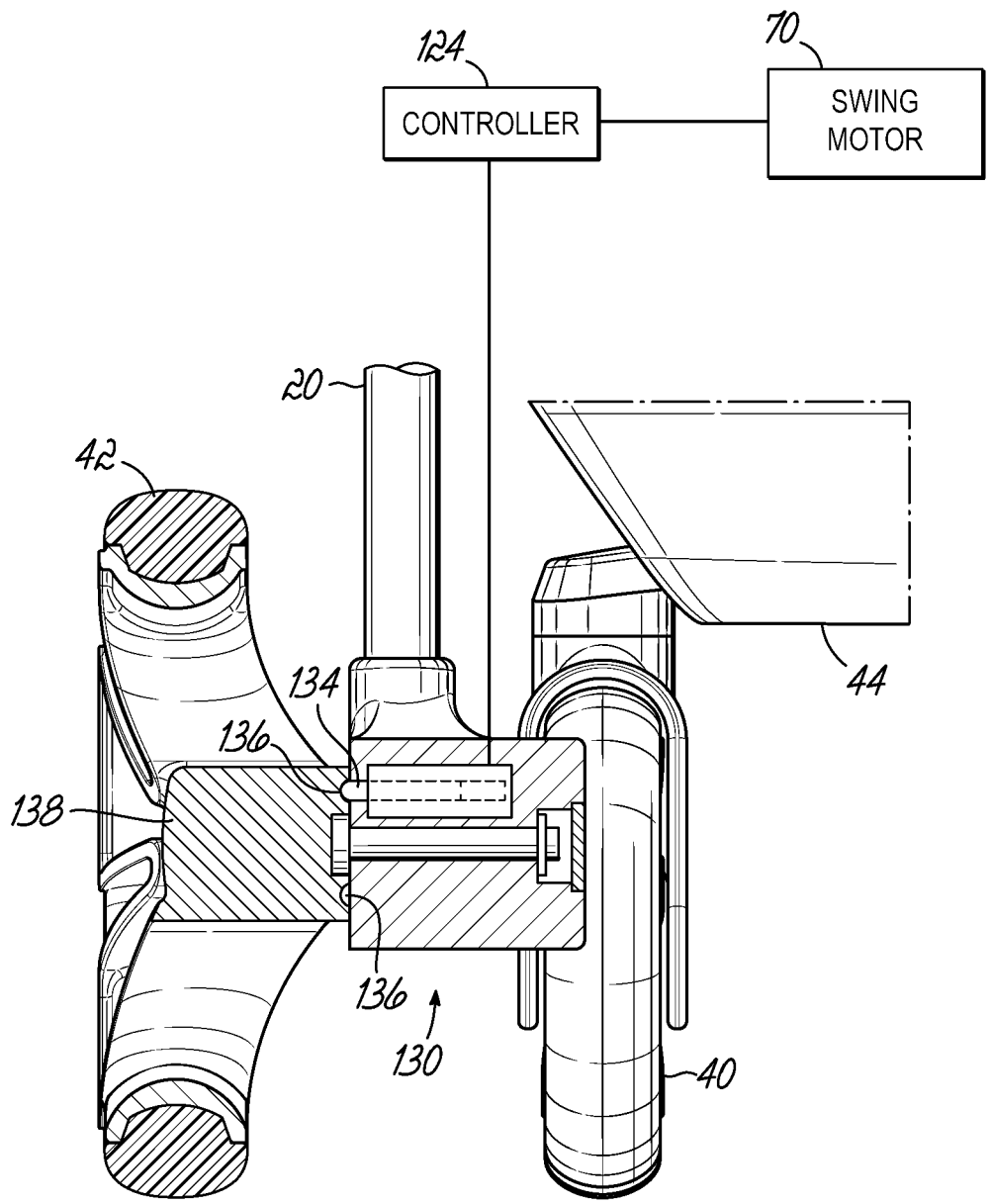
FIG. 8 is a cross-sectional view of a rear wheel of the stroller of FIG. 1 taken along line 8-8.

In an embodiment, one of the rear wheels 42 may include a locking mechanism 130 operatively coupled to the controller 124 as shown in FIG. 8. The locking mechanism 130 includes a solenoid 132, which when activated, pushes out a locking pin 134 which engages one or more holes or detents 136 located around a hub 138 of the rear wheel 42. The controller 124 may be programmed such that when the swing motor 70 is activated, the solenoid 132 is also activated to push the locking pin 134 into the detent 136 to prevent the rear wheel 42 from turning. Consequently, the stroller 10 will not move when the swing motor 70 is activated. When the controller 124 deactivates the swing motor 70, the solenoid 132 retracts the locking pin 134 such that the rear wheel 42 is free to rotate.

Figure 9:
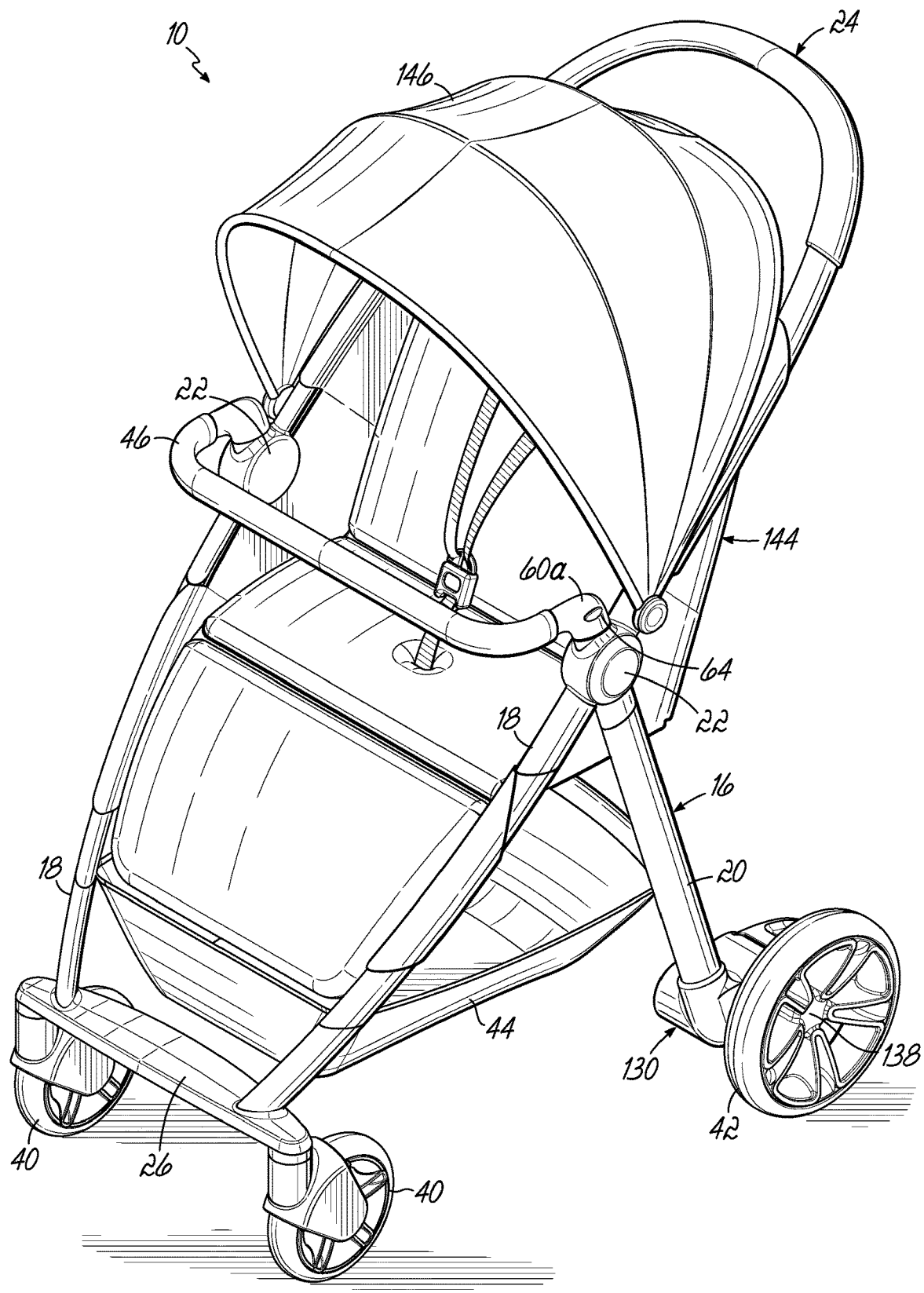
FIG. 9 is a perspective view of the stroller of FIG. 1 with a stroller seat and canopy installed.
Figure 10:
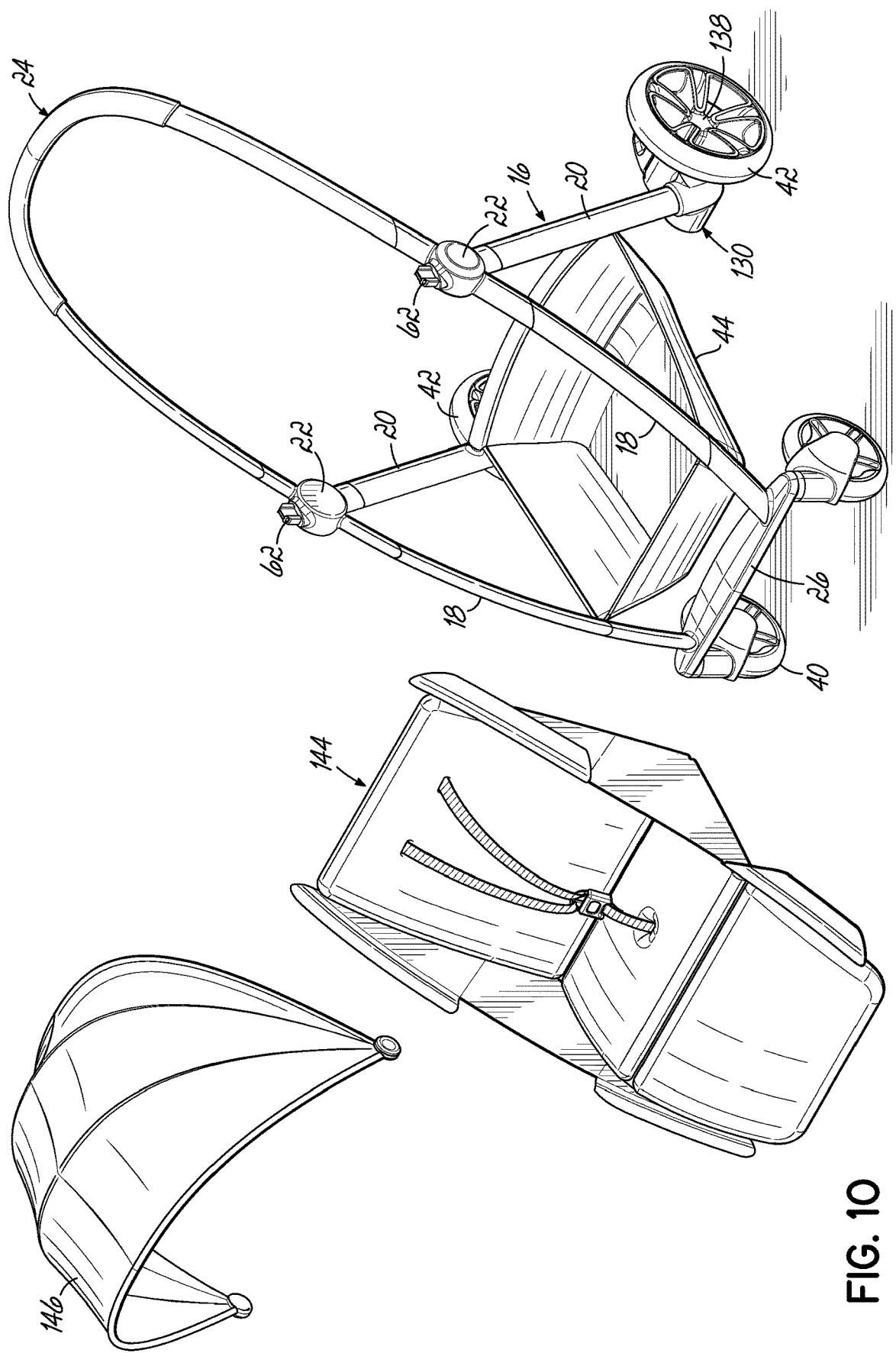
FIG. 10 is a perspective view of the stroller of FIG. 9 with the stroller seat and canopy removed.

With reference to FIGS. 9 and 10, in an embodiment, a seat 144 and retractable canopy 146 may be removably coupled to the support frame 16 and the handle 24. With the seat 144 in place, the bumper bar 46 may be coupled to the junction member 22 via releasable ends 60a. In this configuration, an infant may be placed in the seat 144 and the stroller 10 pushed around much like a conventional stroller.

Figure 11A:
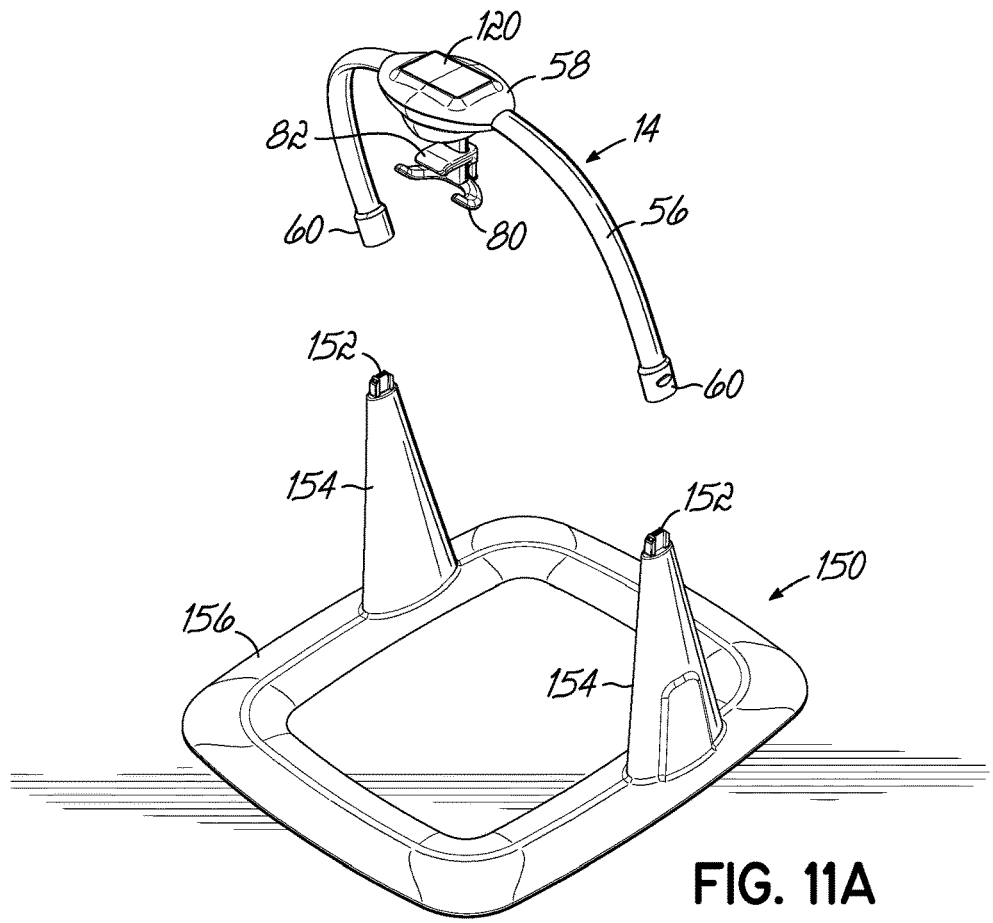
FIG. 11A is a perspective view of a free-standing base configured to selectively receive the seat carrier support.
Figure 11B:
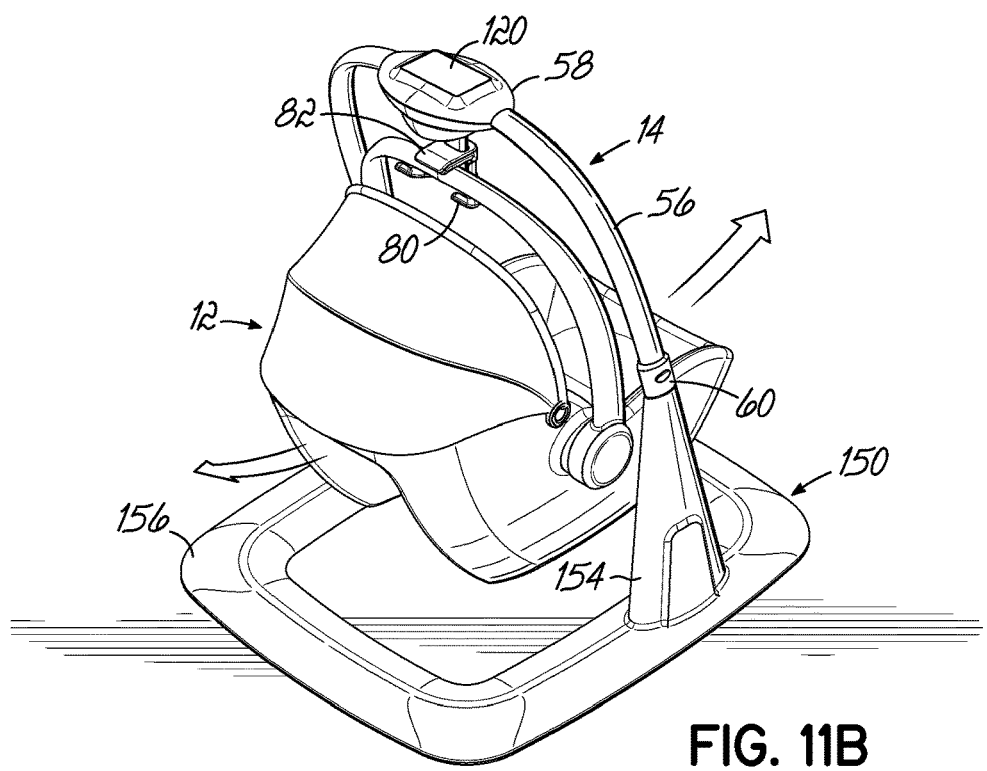
FIG. 11B is a perspective view of the free-standing base of FIG. 11 with the seat carrier support attached to the free-standing base and a baby seat installed.

With reference to FIGS. 11A and 11B, an embodiment contemplates a free-standing base 150 to which the seat carrier support 14 may be releasably attached. For example, the seat carrier support 14 may be removed from the junction member 22 of the stroller 10 and then attached to the free-standing base 150. Thus, the seat carrier support 14 may be used both with the stroller 10 and the free-standing base 150 to swing an infant seat 12. While typically the stroller would be used outdoors, and the free-standing base would be used indoors. It will be appreciated, however, that the stroller 10 with the seat carrier support 14 may be used indoors and the free-standing base 150 may be used outdoors. The free-standing base 150 includes receiving extensions 152 which are essentially the same as receiving extensions 62 on junction member 22, to receive the releasable ends 60 on each down member 56. Collectively, the stroller 10, the free-standing base 150, and the seat carrier support 14, may be considered an infant swing system.

The free-standing base 150 provides additional opportunities to use the seat carrier support 14 away from the stroller 10 so that the infant seat 12 may be positioned and swung remotely from the stroller. For example, a user of the stroller 10 may want to leave the stroller 10 outside, but take the infant seat 12 inside and continue swinging the infant seat 12 like was done while it was coupled to the stroller 10. In one embodiment, the free-standing base 150 includes spaced-apart upright members 154 extending from a support member 156. The upright members 154 have the receiving extensions 152. After the seat carrier support 14 is attached to the upright members 154, the infant seat 12 may be received and retained by the seat swing mechanism 68 (FIG. 11B). The swing motor 70 may be activated to swing the infant seat 12 forwards and backwards as shown by the arrows in FIG. 11B. In one aspect, the upright members 154 may be adjustable so that their height may be changed to accommodate infant seats of different heights. Similarly, the width of the support member 156 maybe be adjustable to accommodate infant seats of different widths.

The combination of the stroller 10 and the free-standing base 150 gives the user much more flexibility. By employing the stroller 10 with the seat carrier support 14, the infant seat 12 holding an infant may be transported directly from a vehicle, such as a car, SUV, or truck, and be coupled to the stroller 10 without having to transfer the infant from the infant seat 12 to a seat on the stroller. As such, the infant in the infant seat 12 does not have to be disturbed if it is sleeping. Similarly, the infant seat 12 could be transported directly from the vehicle and coupled to the free-standing base 150 without disturbing the infant.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A stroller comprising:
a support frame supported by at least two wheels;
a seat carrier support selectively, removably coupled to the support frame;
a swing motor operatively coupled to the seat carrier support; and
a seat swing mechanism extending downwardly from the swing motor, the seat swing mechanism having a seat yoke configured to receive and retain an infant seat,
wherein the seat swing mechanism is configured to swing the infant seat forwards and backwards when the swing motor is activated,
wherein the seat swing mechanism further comprises a main shaft and a clamp member, the clamp member configured to move between a captured position and a release position along the main shaft, wherein in the captured position a handle of the infant seat is captured between the seat yoke and the clamp member, wherein in the release position the handle of the infant seat may be removed from the seat yoke, and
wherein the main shaft has a plurality of grooves and the clamp member has a slide member configured to engage the plurality of grooves so as to prevent the clamp member from moving upwardly along the main shaft and so as to allow the clamp member to move downwardly along the main shaft.

2. The stroller of claim 1, wherein the slide member includes a plurality of complimentary grooves, the slide member being moveable between an engaged position and a disengaged position, wherein in the engaged position the plurality of complimentary grooves is engaged with the plurality of grooves on the main shaft and the clamp member is prevented from moving upwardly along the main shaft and able to move downwardly along the main shaft, wherein in the disengaged position the clamp member is able to move upwardly and downwardly along the main shaft.

3. The stroller of claim 2, wherein the slide member is biased in the engaged position.

4. The stroller of claim 2 wherein the clamp member further includes a release button configured to move the slide member from the engaged position to the disengaged position when the release button is pushed.

5. The stroller of claim 4 wherein the release button includes an extension with a flat section and a ramped section, the slide member having a flat tab, wherein when the release button is pushed, the ramped section contacts the flat tab to move the slide member from the engaged position to the disengaged position.

6. The stroller of claim 1, wherein the seat yoke has an upturned portion and the clamp member has a downturned portion such that when the clamp member is in the captured position the downturned portion and the upturned portion form a retaining channel to retain the handle of the infant seat.

7. The stroller of claim 1, wherein one of the at least two wheels is a rear wheel, the rear wheel having a locking mechanism configured to prevent the rear wheel from turning when the swing motor is activated.

8. The stroller of claim 1, wherein the support frame includes first and second front members and first and second rear members, an upper end of the first front member and an upper end of the first rear member being joined at a junction member, the junction member having a receiving extension configured to receive a releasable end on the seat carrier support.

9. The stroller of claim 1 further comprising a secondary accessory configured to be removably coupled to the support frame when the seat carrier support is not coupled to the support frame.

10. The stroller of claim 1, wherein the seat carrier support includes a housing containing a controller and a screen operatively coupled to the controller and configured to display information, the controller operatively coupled to the swing motor, the housing further includes a first input device operatively coupled to the controller to control an operation of the swing motor and a second input device operatively coupled to the controller to control an operation of the screen.

11. The stroller of claim 10 wherein the first input device is configured to activate or deactivate the swing motor such that when activated the seat swing mechanism swings the infant seat forwards and backwards.

12. An infant swing system comprising:
a seat carrier support having a swing motor and a seat swing mechanism extending downwardly from the swing motor, the seat carrier support having a seat yoke configured to receive and retain an infant seat;
a stroller having a support frame supported by at least two wheels, the support frame configured to selectively, removably receive the seat carrier support; and
a free-standing base configured to selectively, removably receive the seat carrier support,
wherein when the seat carrier support is coupled to either the support frame or the free-standing base, the seat swing mechanism is configured to swing the infant seat forwards and backwards when the swing motor is activated,
wherein the seat swing mechanism further comprises a main shaft and a clamp member, the clamp member configured to move between a captured position and a release position along the main shaft, wherein in the captured position a handle of the infant seat is captured between the seat yoke and the clamp member, wherein in the release position the handle of the infant seat may be removed from the seat yoke, and
wherein the main shaft has a plurality of grooves and the clamp member has a slide member configured to engage the plurality of grooves so as to prevent the clamp member from moving upwardly along the main shaft and so as to allow the clamp member to move downwardly along the main shaft.

13. The infant swing system of claim 12, wherein the slide member includes a plurality of complimentary grooves, the slide member being moveable between an engaged position and a disengaged position, wherein in the engaged position the plurality of complimentary grooves is engaged with the plurality of grooves on the main shaft and the clamp member is prevented from moving upwardly along the main shaft and able to move downwardly along the main shaft, wherein in the disengaged position the clamp member is able to move upwardly and downwardly along the main shaft.

14. The infant swing system of claim 12, wherein the clamp member further includes a release button configured to move the slide member from the engaged position to the disengaged position when the release button is pushed.

15. An infant seat stand comprising:
a free-standing base having two upright members extending from a support member, each upright member having a receiving extension; and
a seat carrier support configured to be selectively, removably coupled to the receiving extensions of the upright members;
a swing motor operatively coupled to the seat carrier support; and
a seat swing mechanism extending downwardly from the swing motor, the seat swing mechanism having seat yoke configured to receive and retain an infant seat;
wherein the seat swing mechanism is configured to swing the infant seat forwards and backwards when the swing motor is activated,
wherein the seat swing mechanism further comprises a main shaft and a clamp member, the clamp member configured to move between a captured position and a release position along the main shaft, wherein in the captured position a handle of the infant seat is captured between the seat yoke and the clamp member, wherein in the release position the handle of the infant seat may be removed from the seat yoke,
wherein the main shaft has a plurality of grooves and the clamp member has a slide member configured to engage the plurality of grooves so as to prevent the clamp member from moving upwardly along the main shaft and so as to allow the clamp member to move downwardly along the main shaft.

* * * * *